United States Patent [19]

Stadlmeier et al.

[11] Patent Number: 5,159,674
[45] Date of Patent: Oct. 27, 1992

[54] METHOD FOR SUPPLYING MICROCOMMANDS TO MULTIPLE INDEPENDENT FUNCTIONAL UNITS HAVING A NEXT MICROCOMMAND AVAILABLE DURING EXECUTION OF A CURRENT MICROCOMMAND

[75] Inventors: Hans Stadlmeier; Franz Schönberger, both of Munich, Fed. Rep. of Germany

[73] Assignee: Siemens Aktiengesellschaft, Munich, Fed. Rep. of Germany

[21] Appl. No.: 526,544

[22] Filed: May 17, 1990

Related U.S. Application Data

[63] Continuation of Ser. No. 816,673, Jan. 2, 1986, abandoned, which is a continuation of Ser. No. 546,896, Oct. 31, 1983, abandoned.

[30] Foreign Application Priority Data

Nov. 9, 1982 [DE] Fed. Rep. of Germany ....... 3241357

[51] Int. Cl.⁵ .............................................. G06F 9/26
[52] U.S. Cl. .................. 395/375; 364/933.5; 364/935.2; 364/942.05; 364/960; 364/247.6; 364/251.7; 364/DIG. 1
[58] Field of Search ... 364/200 MS File, 900 MS File; 395/375

[56] References Cited

U.S. PATENT DOCUMENTS

| | | | |
|---|---|---|---|
| 3,689,895 | 9/1972 | Kitamura | 364/200 |
| 3,771,138 | 11/1973 | Celtruda et al. | 340/172.5 |
| 3,840,861 | 10/1974 | Amdahl et al. | 364/200 |
| 3,905,025 | 9/1975 | Davis et al. | 364/200 |
| 3,969,702 | 7/1976 | Tessera | 364/200 |
| 4,038,643 | 7/1977 | Kim | 364/200 |
| 4,156,925 | 5/1979 | Tutt et al. | 364/900 |
| 4,197,579 | 4/1980 | Otis, Jr. et al. | 364/200 |
| 4,370,709 | 1/1983 | Fosdick | 364/200 |
| 4,373,180 | 2/1983 | Linde | 364/200 |
| 4,451,882 | 5/1984 | Dshkhunian et al. | 364/200 |
| 4,509,140 | 2/1985 | Cheung | 364/900 |

*Primary Examiner*—Thomas C. Lee
*Assistant Examiner*—Paul Harrity
*Attorney, Agent, or Firm*—Herbert L. Lerner; Laurence A. Greenberg

[57] ABSTRACT

A device for supplying microcommands for at least two mutually independent functional units in an integrated microprogrammed electronic module. The device includes a respective microcommand address register and a respective microinstruction register for each of the functional units, and a memory arrangement connected to the functional units which includes at least one microcommand memory, wherein the number of the functional units is greater than the number of microcommand memories, and a method of operating the device.

3 Claims, 1 Drawing Sheet

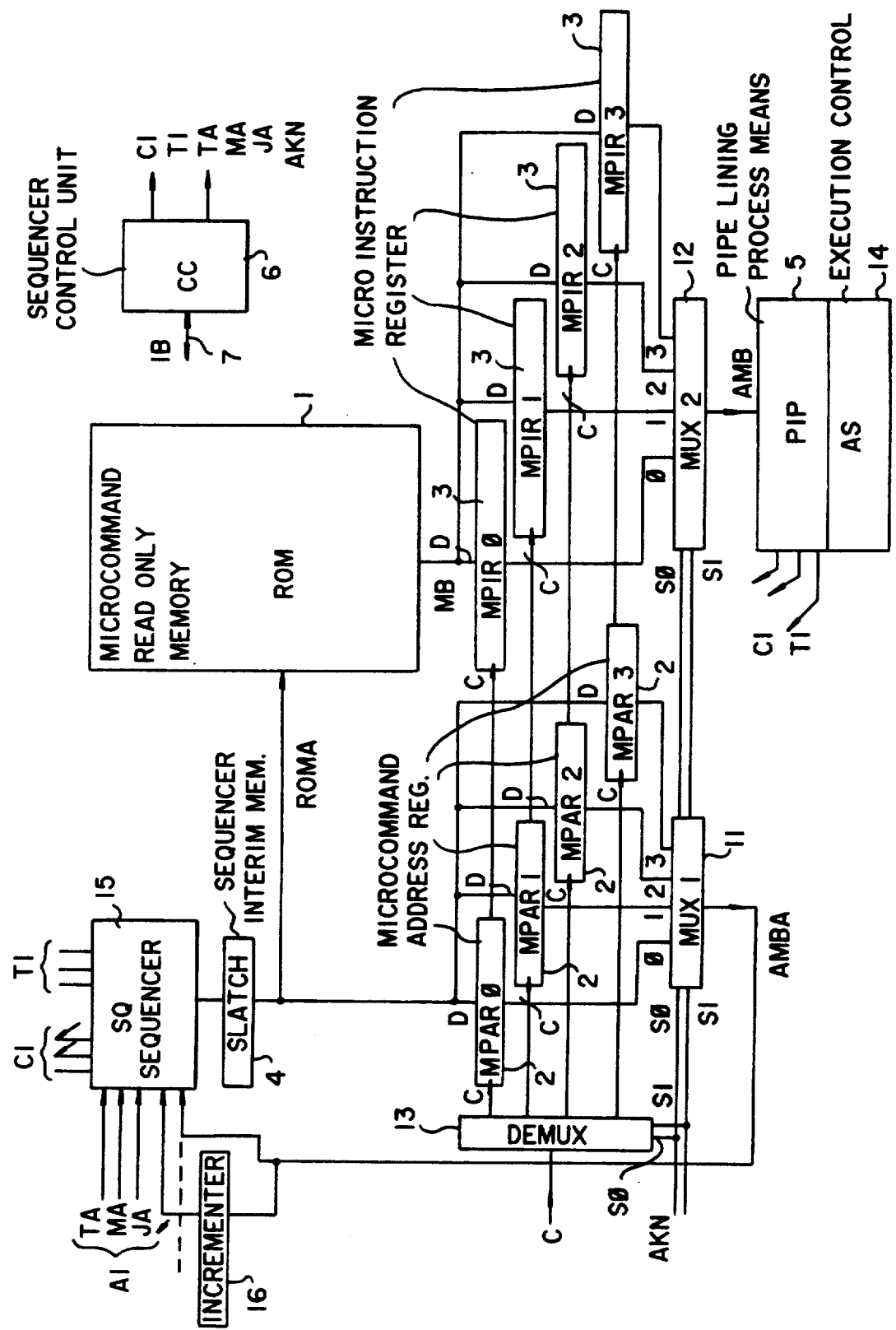

METHOD FOR SUPPLYING MICROCOMMANDS TO MULTIPLE INDEPENDENT FUNCTIONAL UNITS HAVING A NEXT MICROCOMMAND AVAILABLE DURING EXECUTION OF A CURRENT MICROCOMMAND

This application is a continuation of application Ser. No. 816,673, filed Jan. 2, 1986, now abandoned which is a continuation of application Ser. No. 546,896, filed Oct. 31, 1983, now abandoned.

BACKGROUND OF THE INVENTION AND DESCRIPTION OF THE RELATED ART

The invention relates to a device for supplying or making microcommands available for at least two mutually independent functional units in an integrated microprogrammed electronic module and, more specifically, with a respective microcommand address register and a respective microinstruction register for each of the functional units, and a method for operating the same.

An integrated high-performance DMA controller ADMA (advanced direct memory access) has four mutually independent channels which accomplish data transfer between media (peripherals, memories) and, generally, between data sources and data sinks. The channels are independent of one another insofar as they obtain their control parameters (for example, addresses of the data source and the data sink, address counting direction, number of bytes, comparison bit pattern) from control registers assigned thereto, which are loaded with values from control blocks of a so-called organization memory. The spectrum of tasks is the same for all channels. One or more channels can take over additional functions as multiplexer channels.

In spite of the independence of the channels or, more generally, functional units, it is desirable to construct as many resources as possible only once, and to let all channels use these resources. This takes into consideration space and propagation time. This is accomplished, for example, for reasons of physical/system engineering at the input/output interface of the integrated microprogrammed electronic module, because only one set of data and address pins (contact pins) is available. this common utilization (sharing) of resources, however, means that strictly speaking, the channels cannot operate simultaneously, but only in the pipeline mode.

The main control of the channels or more generally, of the functional units, is taken over by microprograms which, when starting the respective channel, read the necessary information from the organization memory, perform internal administrative tasks, control the data transfer per se, and finally store control information again, for example, status, in the organization memory.

Because the channels operate independently, the control information is also needed four times and, for performance reasons (transfer rate, reaction time to transfer requests), the requirements exist that the channel-specific microcommand or general microcommand specific to functional units is immediately ready with selection i.e. prioritization, of the respective channel, and that the respective channel, after the execution of each microcommand, can be interrupted by prioritization of another channel, and that microcommands can run sequentially without time delay.

It is an object of the invention to provide a device for supplying or making microcommands available for a least two mutually independent functional units of the foregoing general type and a method for operating the same, which ensures a high transfer rate and a short reaction time to transfer requests.

SUMMARY OF THE INVENTION

With the foregoing and other objects in view, there is provided, in accordance with the invention, a device for supplying microcommands for at least two mutually independent functional units in an integrated microprogrammed electronic module, comprising a respective microcommand address register and a respective microinstruction register for each of the functional units, and memory means connected to the functional units and including at least one microcommand memory, the number of the functional units being greater than the number of microcommand memories.

In accordance with another feature of the invention, the memory means comprise only a single microcommand memory, and including a single interim memory containing an address for the microcommand memory.

In accordance with an additional feature of the invention, an address of the microcommand contained in the corresponding microinstruction register is contained in every microcommand address register.

In accordance with a further feature of the invention, the microcommand instruction registers represent a step O for a pipeline device connected thereto and for an execution control.

In accordance with again another feature of the invention there are provided means for selecting a functional unit to be newly activated.

In accordance with another aspect of the invention, there is provided a method of operating a device for supplying microcommands for at least two mutually independent functional units in an integrated microprogrammed electronic module with a respective microcommand address register and a respective microinstruction register for each of the functional units and memory means connected to the functional units and including at least one microcommand memory, the number of the functional units being greater than the number of microcommand memories, which comprises selecting a functional unit to be newly activated and, thereafter, reading out the corresponding microinstruction register and the corresponding microcommand address register.

In accordance with an additional mode of the invention, wherein the device also includes a sequencer connected to the memory means, the method further comprises, during execution of a current microcommand, supplying, by means of the sequencer and based upon test and control information, the address of the microcommand following the functional unit which has just been activated.

In accordance with a further mode of the invention, wherein the device includes an interim memory connected to the microcommand memory, the method further comprises interim-storing in the interim memory the address of a new microcommand following the just current microcommand specific to the functional units, and addressing with the last-mentioned address a read cycle in the microcommand memory which supplies the new microcommand.

In accordance with a concomitant mode of the invention, there is provided a method which includes, at the execution end of the current microcommand, entering the following newly read microcommand specific to the functional units the corresponding microinstruction register, and the corresponding last-mentioned address into the corresponding microcommand address register.

Other features which are considered as characteristic for the invention are set forth in the appended claims.

Although the invention is illustrated and described herein as embodied in a device for supplying microcommands for at least two independently operating functional units in an intergrated microprogrammed electronic module, and method of operating the device, it is nevertheless not intended to be limited to the details shown, since various modifications and structural changes may be made therin without departing from the spirit of the invention and within the scope and range of equivalents of the claims.

The construction and method of operation of the invention, however, together with additional objects and advantages thereof will be best understood from the following desciption of specific embodiments when read in connection with the single FIGURE of the drawing which is a basic block diagram of an embodiment of the invention.

BRIEF DESCRIPTION OF THE DRAWING

The single FIGURE of the drawing is a block diagram of the invention showing the major building block and their interconnections.

DESCRIPTION OF THE PREFERRED EMBODIMENTS

Referring now to the drawing, it is noted that, instead of constructing four identical cicrocommand read-only memories ROM 1 each with a respective corresponding microcommand address register MPARi2, wherein i = 0, 1, 2, 3 and with a respective microinstruction register MPIRi3, wherein i = 0, 1, 2, 3, only a single microcommand read-only memory ROM 1 is used in one embodiment of the device according to the invention, four different channel-specific or, more generally, functional unit-specific microcommand address registers MPARi2 and mic instruction registers MPIRi3 are required, and altogether only a single sequencer interim memory SLATCH4, which contains the ROM-addressing address ROMA.

In each microcommand address register MPARi2, there is stored the address of the microcommand MB stored in the corresponding microinstruction register MPIRI3. The four microinstruction registers MPIRi represent the initial stage 0 of the following pipelining process of the execution control AS. For this purpose, means PIP5 are provided which make the pipelining possible.

The four channels or, more generally, functional units obtain their control parameters from control registers (not shown) assigned to them in a central control unit CC6. These control registers in the central control unit CC6 are loaded with valves from control blocks of a so-called organization memory (not shown). The central control unit CC can be loaded via an internal data bus IB7. The central control unit CC6 additionally has a unit for prioritizing a channel or a functional unit. The channel to be activated next is selected or prioritized by means of a signal AKN. With the selection of the channel to be activated, the corresponding microinstruction register MPIRi3 and the corresponding microaddress register MPARi2 are loaded. For this purpose, the signal AKN controls, via two control lines S08, S19, two multiplexers MUX11, MUX12 and a demultiplexer DEMUX13. Due to the signal AKN, the next, now current or actual microcommand address AMBA belonging to the prioritized channel appears at the output of the multiplexer MUX1. Due to the signal AKN, the next, now current microcommand AMB belonging to the prioritized channel appears at the output of the multiplexer MUX2. The demultiplexer DEMUX13 has available an input with a clock signal C. The microcommand address registers MPARi2 and the microinstruction registers MPORi2 belonging to the prioritized channel are clocked by this clock signal C.

The execution of the next, i.e. now current microcommand AMB is monitored by an execution control AS. The execution of successive microcommands AMB is advantageously effected by the pipeline method in the device PIP, suitable therefor. During the execution of the current or actual microcommand AMB, a sequencer SQ15, as a result of test information TI and control information CI, makes available the microcommand address ROMA of the microcommand MB following the channel just prioritized. This microcommand address ROMA is interim-stored in an interim memory SLATCH4 and addresses the read cycle in the microcommand read-only memory ROMI, which then furnishes the new channel-specific or, more generally, functional unit-specfic new microcommand MB.

The control information CI and the test information TI are furnished by the central control unit CC6 as well as by the execution control AS14. The current or actual microcommand address AMBA can be incremented via an incrementer INCR16, and furnish, in this manner, the microcommand address ROMA of the channel-specific, successive new microcommand MB. The sequencer SQ15 obtains additional address information AI from the central control unit CC6. It may, for example, be a test address TA, a map address MA or a jump address JA.

At the execution end of the current microcommand AMB, the channel-specific following microcommand MB which is newly read is entered into the corresponding channel-specific microinstruction register MPIRi3 and the following new corresponding microcommand address ROMA is entered from the interim memory SLATCH4 into the corresponding channel-specific microprogram address register MPARi2 of the current or actual channel. If the selection of the channel which is just then current is interrupted, the microcommand belonging to this channel stands immediately ready in the corresponding microinstruction register MPIRi3 if this channel is later prioritized again. Address information AI can also be made ready by the execution control AS14.

The foregoing is a description corresponding in substance to German Application P 32 41 357.2, dated Nov. 9, 1982the International priority of which is being claimed for the instant application, and which is hereby made part of this application. Any material discrepancies between the foregoing specification and the aforementioned corresponding German application are to be resolved in favor of the latter.

We claim:

1. Method for transferring data between a plurality of data sources and data sinks via channels by means of microcommands controlling at least three mutually independent functional units of a multichannel direct memory access system in an integrated microprogrammed electronic module, each functional unit connected with a respective microcommand address register and a respective microinstruction register; microcommand memory means directly connected with the microinstruction registers; a sequencer connected to the microcommand memory means and to said microcommand address registers; the method which comprises the steps of:
- (a) selecting any one of said functional units for data transfer,
- (b) forming during execution of a current microcommand, by means of the sequencer and based upon test and control information, an address of a microcommand following the current microcommand,
- (c) loading the following microcommand directly into the respective microinstruction register from said microcommand memory means and loading the address of the following microcommand into the respective microcommand address register from the sequencer, and
- (d) controlling with the following microcommand the functional unit which has been selected.

2. Method according to claim 1, wherein an interim memory is connected to the sequencer, said microcommand memory, and said microcommand address registers, which further comprises the steps of:
- (c1) interim-storing in the interim memory said address of the microcommand following the current microcommand, formed during execution of the current microcommand, and
- (c2) addressing a read cycle in the microcommand memory means which supplies the following microcommand.

3. Method according to claim 2, which comprises the steps of, at the end of the execution of the microcommand, entering the following newly read microcommand from the memory controlling, via control means, the respective functional unit into the corresponding microinstruction register, and entering the corresponding last-mentioned address from the interim memory into the corresponding microcommand address register.

* * * * *